United States Patent Office 2,833,811
Patented May 6, 1958

2,833,811

CARBOXYLIC ACID ESTERS OF CIS-3,7-DIMETHYL-2-OCTEN-1-OL

Joseph Donald Surmatis, Pompton Plains, N. J., assignor to Hoffmann-La Roche Inc., Nutley, N. J., a corporation of New Jersey No Drawing. Application October 11, 1954
Serial No. 461,669

4 Claims. (Cl. 260—476)

This invention relates to novel chemical compounds useful as odor-imparting agents in the preparation of perfumes and of scented compositions generally, and to novel processes and novel intermediates useful in making such odor-imparting agents. More particularly, it relates to certain carboxylic acid esters of cis-3,7-dimethyl-2-octen-1-ol.

This application is a continuation-in-part of my co-pending application Serial No. 407,180, filed January 29, 1954, now Patent No. 2,780,658, issued February 5, 1957.

For purposes of this disclosure, the term "cis" is to be understood as designating a steric configuration analogous to that of geraniol, i. e. a configuration such that in the 2-octene derivatives described below, the hydrogen atom attached to the number 2 carbon atom and the 4-methyl-1-pentanyl radical attached to the number 3 carbon atom can be considered as lying on the same side of a plane passed through the rigid olefinic linkage connecting said carbon atoms. Conversely, the hydroxymethyl group (or esterified hydroxymethyl group) attached to the number 2 carbon atom and the methyl group attached to the number 3 carbon atom can be considered as both lying on the opposite side of said above-mentioned plane, see Formulas II, III and IV below.

A quick survey of the invention is afforded by the following flow sheet, wherein

represents a carbonylic acyl radical of an organic carboxylic acid; preferably one in which R represents a monovalent hydrocarbon radical, and still more preferably one in which R represents an alkyl or cycloalkyl or monocyclic aryl hydrocarbon radical. For example,

can represent alkanoyl, such as acetyl or palmitoyl; or monocyclic hydrocarbon aroyl, such as benzoyl or toluoyl.

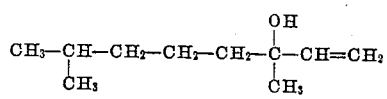

(I)   3,7-dimethyl-1-octen-3-ol

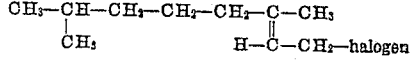

$CH_3$—CH—$CH_2$—$CH_2$—$CH_2$—C—$CH_3$
     |                              ||
    $CH_3$                     H—C—$CH_2$—halogen (II)   Cis-1-halo-3,7-dimethyl-2-octene

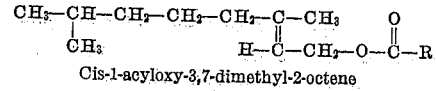

(III)   Cis-1-acyloxy-3,7-dimethyl-2-octene

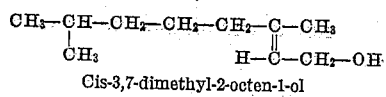

(IV)   Cis-3,7-dimethyl-2-octen-1-ol

It will be apparent from the above flow sheet that the starting material of the invention is the known compound 3,7-dimethyl-1-octen-3-ol (I). One comprehensive procedure herein described comprises treating 3,7-dimethyl-1-octen-3-ol with a concentrated aqueous solution of a hydrohalic acid to produce cis-1-halo-3,7-dimethyl-2-octene (II), preferably by treating (I) with commercial concentrated aqueous hydrochloric acid of approximately 37 percent by weight concentration or commercial concentrated aqueous hydrobromic acid of approximately 48 percent by weight concentration; exchanging the 1-halo substituent of (II) for an acyloxy radical

wherein

has the meaning stated above, for instance by reacting (II) with an alkali metal salt of the particular acid, e. g.

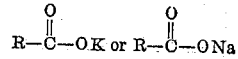

to produce cis-1-acyloxy-3,7-dimethyl-2-octene (III); and hydrolyzing (III) to yield cis-3,7-dimethyl-2-octen-1-ol (IV), e. g. by saponifying with aqueous-alcoholic potassium hydroxide solution.

In addition to the method disclosed above for making the novel odor-imparting agents designated by the nomenclature cis-1-acyloxy-3,7-dimethyl-2-octene, Formula III, an alternative method comprises directly esterifying cis-3,7-dimethyl-2-octen-1-ol with an acylating agent appropriate to introduce the acyl radical of the desired acid, such acylating agents including the acids themselves, their halides and their anhydrides. A preferred group of odor-imparting agents among those compounds of the invention having Formula III above comprises those esters wherein R represents hydrogen or a hydrocarbon radical having not more than seven carbon atoms, e. g. a lower alkyl radical such as methyl, ethyl, isobutyl, n-heptyl and the like, or a cycloalkyl radical such as cyclohexyl or cyclopentyl, or a hydrocarbon aryl radical such as phenyl or tolyl. Esters of this class, wherein the acyl radical contains not more than eight carbon atoms and consists of carbon and hydrogen atoms only, exclusive of a single oxygen atom contained in a carbonyl group, are especially valuable as odor-imparting agents for use in compounding perfumes and scented compositions.

The invention is further disclosed in the following examples, which are illustrative but not limitative thereof:

*Example 1*

234 grams of 3,7-dimethyl-1-octen-3-ol was placed in a 2-liter flask provided with a mechanical stirrer. To this there was added 600 cc. of 48 percent aqueous hydrobromic acid. The mixture was stirred for 2 hours at room temperature. The oil layer was removed, washed twice with 500 cc. of water, and dried over anhydrous calcium chloride. The product thus obtained, cis-1-bromo-3,7-dimethyl-2-octene, had $n_D^{25}=1.4630$.

Example 2

The total quantity of cis-1-bromo-3,7-dimethyl-2-octene from Example 1 was placed in a 5-liter round bottom flask with three liters of acetone and 400 grams of anhydrous potassium acetate. The mixture was stirred at reflux temperature for 24 hours. At the end of this time, the acetone was distilled off under vacuum of 100 mm. and the residue in the flask was taken up in one liter of water. The oil which separated was dried over anhydrous calcium sulfate and distilled under vacuum. The cis-1-acetoxy-3,7-dimethyl-2-octene obtained as the main fraction distilled at 80° C. at 1.4 mm., $n_D^{25}=1.4424$. This product is a colorless oil possessing a pleasant fruity odor reminiscent of pears, and is useful as an odor-imparting agent in the preparation of perfumes and scented compositions.

Example 3

102.5 grams of cis-1-acetoxy-3,7-dimethyl-2-octene was placed in a 1-liter flask fitted with a stirrer. To this was added 500 cc. of ethyl alcohol and a solution of 60 grams of potassium hydroxide in 120 cc. of water. The solution was stirred at 40° C. for 4 hours. The product was diluted with one liter of cold water. The oil layer was removed, and the aqueous portion was extracted 4 times, each time with 500 cc. of petroleum ether. The combined product and extracts were washed neutral with water and the solvent was removed under vacuum. The main fraction, cis-3,7-dimethyl-2-octen-1-ol, distilled at 118–119° C. at 20 mm., $n_D^{25}=1.4522$. This product has a pleasant flowery odor reminiscent of fresh roses; it is useful as an odor-imparting agent in the compounding of perfumes and perfumed compositions.

Example 4

46.8 grams of cis-3,7-dimethyl-2-octen-1-ol was placed in a flask with 65 grams of isobutyric anhydride and 100 cc. of pyridine. The solution was stirred at 60–70° C. for two hours. At the end of this period, the reaction mixture was washed with 500 cc. of water, 500 cc. of 5 percent aqueous sulfuric acid, 500 cc. of 5 percent aqueous sodium carbonate and finally with 500 cc. of water. The resulting oil was dried over anhydrous calcium sulfate and fractionated through a column. Cis-1-isobutyroxy-3,7-dimethyl-2-octene distilled at 74° C. at 0.3 mm., $n_D^{25}=1.441$. The material has a pleasant odor reminiscent of roses, but with fruity accents, and is useful as an odor-imparting agent.

Example 5

A mixture of 50 grams of cis-3,7-dimethyl-2-octen-1-ol, 60 g. of formic acid and 200 cc. of petroleum ether was stirred at reflux temperature for four hours. The reaction mixture was washed with 500 cc. of water, with 500 cc. of 5 percent aqueous sodium bicarbonate solution, and finally with 500 cc. of water. The oil was dried over anhydrous calcium sulfate and fractionated. The resulting cis-1-formyloxy-3,7-dimethyl-2-octene distilled at 80° C. at 3 mm., $n_D^{25}=1.443$. It has a fragrance reminiscent of roses, and is useful as an odor-imparting agent.

Example 6

78 grams of cis-3,7-dimethyl-2-octen-1-ol and 100 cc. of pyridine were placed in a flask provided with a stirrer. 70 grams of benzoyl chloride was dropped in from a dropping funnel in 15 minutes. During the addition the temperature was allowed to rise to 80° C. Stirring was then continued until the temperature came down to room temperature. The reaction mixture was washed with 500 cc. of water, 500 cc. of 5 percent aqueous sulfuric acid, 500 cc. of 5 percent aqueous sodium carbonate and finally with 500 cc. of water. After drying over anhydrous calcium sulfate the product was fractionated. The material boiling at 130° C. at 0.4 mm., $n_D^{25}=1.501$ was essentially cis-1-benzoyloxy - 3,7 - dimethyl-2-octene. It has a roselike fragrance, and is useful as an odor-imparting agent.

Example 7

156 grams of 3,7-dimethyl-1-octen-3-ol was stirred for one hour with 500 cc. of concentrated aqueous hydrochloric acid (37 percent by weight HCl) at room temperature. The oil layer was separated by means of a separatory funnel, washed twice with one liter of water, and dried over calcium chloride. The product thus obtained, cis-1-chloro-3,7-dimethyl-2-octene, was used for the next example without further purification.

Example 8

The entire amount of the cis-1-chloro-3,7-dimethyl-2-octene obtained in Example 7 was placed in a flask with 2 liters of acetone and 270 grams of potassium acetate (anhydrous). The mixture was stirred at reflux for 60 hours. The acetone was distilled off under vacuum, and the residue in the flask was washed with one liter of water. The oil which separated was washed a second time with 500 cc. of water, and dried over anhydrous calcium sulfate. The fraction distilling at 89° C. at 8 mm., $n_D^{25}=1.442$ was essentially cis-1-acetoxy-3,7-dimethyl-2-octene.

I claim:

1. Cis-1-acyloxy-3,7-dimethyl-2-octene wherein the acyl radical contains not more than eight carbon atoms and consists of carbon and hydrogen atoms only, exclusive of a single oxygen atom contained in a carbonyl group.
2. Cis-1-lower alkanoyloxy-3,7-dimethyl-2-octene.
3. Cis-1-isobutyroxy-3,7-dimethyl-2-octene.
4. Cis-1-benzoyloxy-3,7-dimethyl-2-octene.

References Cited in the file of this patent

UNITED STATES PATENTS

| | | |
|---|---|---|
| 2,434,394 | Cheney et al. | Jan. 13, 1948 |
| 2,555,598 | Newman | June 5, 1951 |
| 2,555,989 | Newman | June 5, 1951 |
| 2,583,426 | Hillyer et al. | Jan. 22, 1952 |

OTHER REFERENCES

Locquin et al.: Comp. Rend. 174 (1922), pp. 1711–13.
Karrer et al.: Helv. Chim. Acta 23 (1940), pp. 581–4.
Simonsen et al.: "The Terpenes," vol. 1, (1953), pp. 63–64.